United States Patent
Kadle et al.

(10) Patent No.: US 6,705,112 B1
(45) Date of Patent: Mar. 16, 2004

(54) ALTERNATE REFRIGERANT AIR CONDITIONING SYSTEM

(75) Inventors: Prasad Shripad Kadle, East Amherst, NY (US); Jing Zheng, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/339,179

(22) Filed: Jan. 9, 2003

(51) Int. Cl.[7] .............................. F25B 41/04; F25B 49/00
(52) U.S. Cl. ........................................ 62/498; 62/196.4
(58) Field of Search .......................... 62/196.1, 196.4, 62/498, 198, 197; 251/129.11

(56) References Cited

U.S. PATENT DOCUMENTS

| | | | | |
|---|---|---|---|---|
| 1,801,371 A | * | 4/1931 | Snader | 62/203 |
| 3,070,974 A | * | 1/1963 | Greenwald | 62/197 |
| 3,090,382 A | * | 5/1963 | Fegan et al. | 128/204.16 |
| 4,268,291 A | * | 5/1981 | Cann | 62/117 |
| 4,545,215 A | * | 10/1985 | Inoue | 62/216 |
| 5,088,303 A | * | 2/1992 | Da Costa | 62/498 |
| 5,226,451 A | * | 7/1993 | Brumfield | 137/625.11 |
| 5,660,051 A | | 8/1997 | Sakakibara et al. | 62/133 |
| 5,918,475 A | | 7/1999 | Sakakibara et al. | 62/186 |
| 5,983,657 A | | 11/1999 | Murata et al. | 62/228.3 |
| 6,076,553 A | * | 6/2000 | Sugita et al. | 137/625.43 |
| 6,560,986 B1 | * | 5/2003 | Welch | 62/509 |

* cited by examiner

Primary Examiner—William C. Doerrler
(74) Attorney, Agent, or Firm—Patrick M. Griffin

(57) ABSTRACT

An air conditioning system with alternate refrigerant includes isolates an evaporator (22) from the rest of the system not with a conventional, high pressure resisting shut off valve, but by establishing a pair of independent refrigerant loops from the standard single loop when the system shuts down. A valve housing (28) has three ports on one side, an upper port (34) connected to the condenser outlet (16), a central port (36) connected to the compressor inlet (10), and a lower port (38) connected to the evaporator outlet (24). On the other side, a single port (40) is connected to the evaporator inlet (20). Inside the valve housing, a movable valve member (30) shifts position between a normal, operating position that interconnects the heat exchangers (14, 22), through the ports in a single loop, and a system off position which, through a different arrangement of the ports, creates a separate, isolation loop for just the evaporator (22).

3 Claims, 2 Drawing Sheets

ALTERNATE REFRIGERANT AIR CONDITIONING SYSTEM

TECHNICAL FIELD

This invention relates to alternate refrigerant automotive air conditioning systems in general, and specifically to such a system that has a means for selectively segregating the refrigerant within independent and isolated loops.

BACKGROUND OF THE INVENTION

Currently used automotive air conditioning system refrigerants may, in the future, be eliminated in favor of refrigerants with less perceived global warming potential. Depending on the alternate refrigerant used, it may be desirable to provide various systems and mechanisms to isolate and segregate the alternate refrigerant with the air conditioning system, or to block it from reaching certain parts of the vehicle under certain conditions, such as a system leak. The same considerations may apply to residential systems.

Current proposals for such mechanisms typically incorporate nothing more than the obvious expedient of shut off or blocking valves designed to close off various points along the refrigeration lines in the event of leaks or breaks, similar to automatically closing bulkhead doors in a ship. Blocking valves, operated by solenoids, may close automatically when a compressor is shut down, or in the event of a sensed collision or in the event of a sensed leak. Examples of these various proposals may be seen in U.S. Pat. Nos. 5,660,051, 5,918,475 and 5,983,657. To the extent that these designs create an automatic blockage of the refrigerant lines between the exterior mounted condenser and the interior mounted evaporator, the valves, two of which are needed (one on either side of the evaporator) have to reliably seal a high-pressure area (condenser) from a low-pressure area (evaporator). Since seals is such an application are required, at least initially, to hold back a high pressure, they are therefore subject to leakage, as is any high-pressure seal.

SUMMARY OF THE INVENTION

The subject invention provides a single valve mechanism that isolates the low pressure area of the refrigerant system from the high pressure area without the necessity of holding back a high pressure, as with a conventional blocking valve.

In the preferred embodiment disclosed, an air conditioning system has a low pressure area in the form of an evaporator with an inlet and an outlet, a compressor with an inlet located downstream of the evaporator, and a high pressure area in the form of a condenser with an inlet located downstream of the compressor and an outlet located upstream of the evaporator inlet. This is typical of automotive and other air conditioning systems. It may be desirable to limit the amount of refrigerant that is in, and which can continue to enter, the lower pressure evaporator after the compressor and system have been shut down for any reason.

In the preferred embodiment disclosed, a valve housing has several possible refrigerant ports. On one side of the valve housing, there are three ports, upper, central and lower. The upper port is connected to the condenser outlet and always receives refrigerant therefrom, regardless of its ultimate destination. The central port is connected to the compressor inlet (or compressor suction port), and always directs refrigerant thereto, regardless of its immediate source. The lower port is connected to the evaporator outlet, and a single port on the opposite side of the valve housing is connected to the evaporator inlet. Inside the valve housing, a suitable mechanism, movable between a normal operating position and an evaporator isolation position, serves to selectively interconnect or block the various ports from one another. In the operating position, selected when the compressor is running and all other sensed conditions are normal, the valve mechanism moves so that the upper port and single port of the housing are interconnected, while the central and lower ports are interconnected. This allows refrigerant to flow from the compressor and high pressure condenser into the upper port, out the single port and into the evaporator inlet, through the evaporator to the lower port, and then out the central port to the compressor inlet. This single loop is typical of the standard cycle. In the evaporator isolation position, selected when the compressor is shut off and/or other abnormal conditions (leakage) are sensed, the valve mechanism moves so that the upper and central ports are interconnected, while the single and lower ports are interconnected. This puts the evaporator in its own isolated loop, with its inlet and outlet by passed or short circuited one to the other. At the same time, the compressor, high pressure condenser and any other components associated therewith are placed in a separate, isolated loop, around which refrigerant can flow until pressure is equalized within that loop. At no point is a location within a loop simply sealed or blocked, in dam like fashion. While the two loops have to be kept substantially sealed from one another, the pressure differential between them is not as high as the pressure differential would be across a standard shut off valve, and the necessary sealing integrity is easily achieved by a close fit of the single valve mechanism within the single valve housing.

DESCRIPTION OF THE PREFERRED EMBODIMENT

Figure 1:
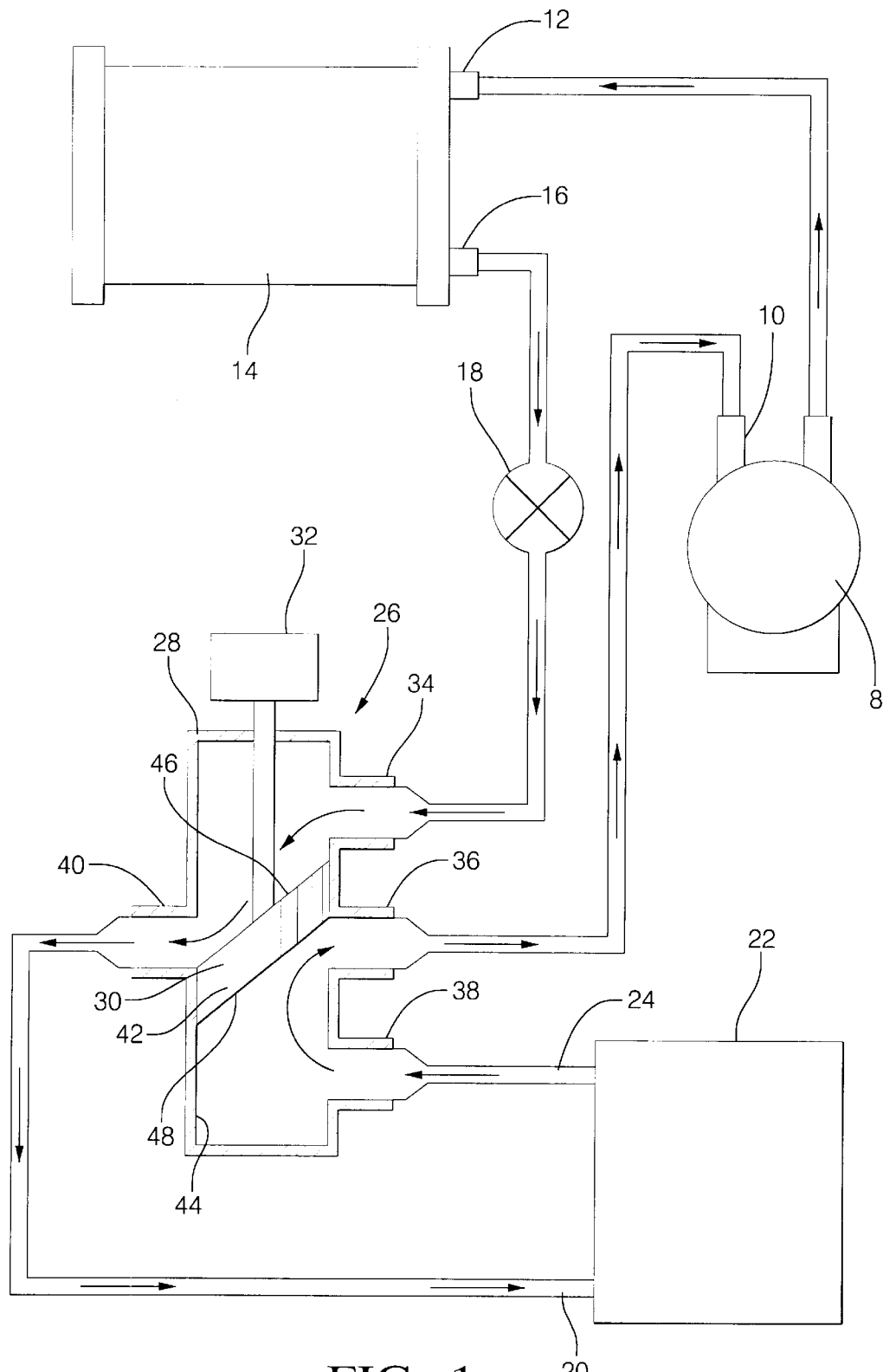
FIG. 1 is a schematic view of a system incorporating the invention in a normal, operating mode.

Referring first to FIG. 1, a typical, closed loop cooling system of the type used for vehicle or residential air conditioning has a compressor 8 with an inlet 10. Compressor 8 pumps pressurized, super heated refrigerant vapor to the inlet 12 of an outside heat exchanger or condenser 14, from which condensed, liquid refrigerant flows through the condenser outlet 16 and through an expansion device 18, which rapidly lowers the pressure of the liquid refrigerant into a cold vapor. From expansion device 18, cold refrigerant vapor flows into an evaporator inlet 20 and through evaporator 22, across which warm, interior air is blown and cooled. The now warmed refrigerant vapor flows out evaporator outlet 24 back to compressor 8 to begin the cycle anew. The inlets and outlets of condenser 14 and evaporator 22 are interconnected by elongated lines or hoses, not separately numbered, through which refrigerant is routed. In a typical system, other components would also be used, such as a refrigerant reservoir canister, etc, but these are well known to those skilled in the art, and only the very basic components need to be described here. During normal operation, the portion of the loop containing the condenser 14 and compressor 8 is the "high pressure side," and the portion of the loop containing the evaporator 22 is the "low pressure side," even though it is a single, interconnected loop. When compressor 8 and the system shut down, pressure eventually equalizes around the loop, as there is nothing to preferentially keep refrigerant in or out of any particular part of the system.

Still referring to FIG. 1, the system of the invention incorporates a special valve, indicated generally at 26, comprised of a generally cylindrical housing 28, a movable internal valve member 30, and an actuator 32 therefore. Housing 28 would be made of a durable, refrigerant resistant material, and serves basically as a junction point to allow the refrigerant line interconnections between the condenser 14 and evaporator 22 to be switched in a manner described below. Conversely, in a conventional system, those interconnections are not changeable. To that end, housing 28 is formed with three ports on one side, upper, central and lower ports 34, 36 and 38 respectively, and a single port 40 on the other side, substantially opposed to the central port 36. The locational terms for the ports 34, 36 and 38 are arbitrary, of course, not intended to be limiting, and refer only to their location on the drawing page. Upper port 34 is connected to the condenser outlet 16, and receives refrigerant therefrom to be routed either to the evaporator inlet 20, as shown, or, alternately, back the condenser inlet 12, as described below. Central port 36 is connected to the compressor inlet 10, and always routes refrigerant thereto, although the origin of that refrigerant may be either the lower housing port 38, as shown or, alternately, the upper housing port 34, also described below. Lower port 38 is connected to the evaporator outlet 24 and refrigerant that it receives therefrom may either be routed to the central port 36, as shown, or, alternately, to the single port 40. The single, opposed port 40 is interconnected to the evaporator inlet 20 and, when it receives refrigerant from upper port 34, as shown, that is routed to the evaporator inlet 20 or, alternately, it may be connected to the lower port 38. The movable valve member 30 is the element that provides these selective interconnections among the housing ports just described. In the embodiment disclosed, it is a disk that consists of diagonal slice out of a solid cylinder, with an outer edge 42 that closely matches the inner cylindrical surface 44 of housing 28, and continuous upper and lower surfaces 46 and 48. Outer edge 42 fits within housing inner surface 44 closely enough to prevent leakage at the interface, but not so tightly as to prevent turning. Rotary actuator 32 is coaxial to housing 28 and turns disk 30 about that axis by any mechanism capable of effectively moving disk 30 through 180 degrees back and forth.

Figure 2:
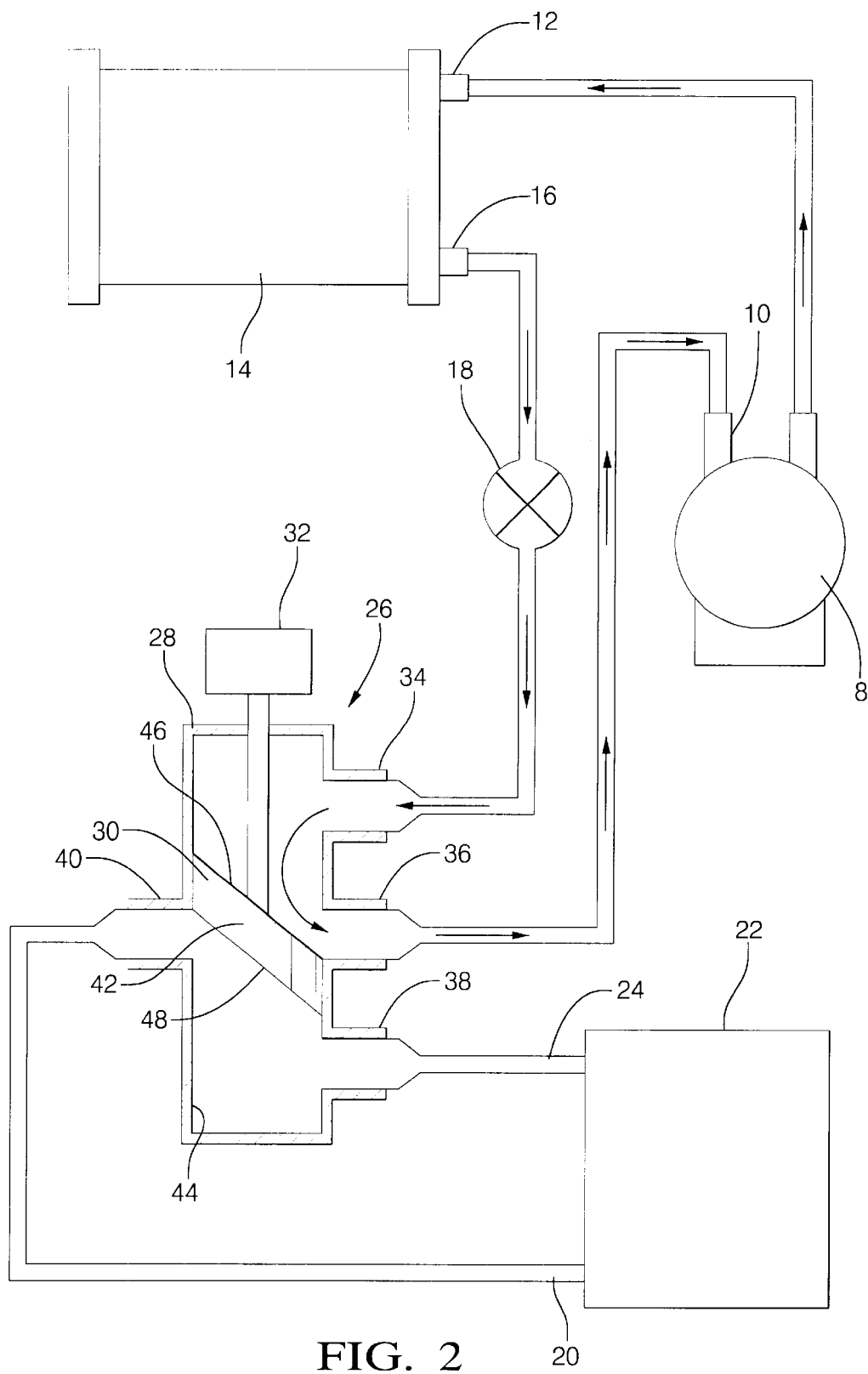
FIG. 2 is a schematic view showing the system in the compressor off or isolation mode.

Referring next to FIGS. 1 and 2, the normal, operating position of disk 30 within housing 28, which would obtain when compressor 8 was operating and all sensed conditions were normal, is shown in FIG. 1, while the "system off" position is shown in FIG. 2. If desired, actuator 32 and the control means for the system could be designed such that actuator 32 would have to be energized and overcome a spring or other return mechanism to attain the FIG. 1 position, and would automatically return to the FIG. 2 position when compressor 8 was shut down or the system otherwise lost electrical power. In the FIG. 1 position, a single, conventional refrigerant loop is attained, interconnecting compressor 8, condenser 14, expansion device 18, and evaporator 22. Specifically, refrigerant from condenser outlet 16 passes expansion device 18, enters valve housing 28 through upper port 34, and passes along disk upper surface 46, out through single port 40 and on to evaporator inlet 20. Refrigerant passes through the interior of housing 28, which is larger in diameter of the refrigerant lines, with no significant restriction. From evaporator 22, refrigerant exits outlet 24, passes through lower port 38, along the disk lower surface 48 and out central port 36 back to compressor inlet 10. Valve 26 is thus transparent to the basic, normal operation. When disk 30 is turned by actuator 32 180 degrees to the FIG. 2 position, in response to the shut down of compressor 8 or some other signal, single port 40 is cut off from upper port 34 which is, instead, opened to central port 36. This establishes a new loop interconnecting compressor 8 and condenser 14. As opposed to the old expedient of simply closing off the pressurized condenser 14 at the inlet 12 and outlet 16, and holding back the high pressure, like a dam in a river, refrigerant from condenser 14 is allowed to flow around the newly created loop, from upper port 34, along disk upper surface 46 to central port 36 and back to compressor inlet 10. By expanding into this extra volume in the new loop, the refrigerant settles down to a lower pressure. Concurrently, lower port 38 is cut off from central port 36 and is opened instead to single port 40, thereby "short circuiting" the evaporator inlet 20 and outlet 24 directly to one another. This constitutes a second independent loop, in effect, incorporating only the evaporator 22. Refrigerant would not likely flow to any significant extent just from inlet 20 to outlet 24, but it need not, since the object is to isolate evaporator 22 against the entry of any more refrigerant. The single valve 26 thereby achieves what multiple valves previously did, and without having to resist a high a pressure.

Variations in or additions to the disclosed embodiment could be made. Any component or combination of components in the system, not just the evaporator (22), could be provided with a similar isolation loop created by the same combination of selected valve ports. The valve 26 could be controlled to switch to the evaporator isolation position not just in response to ordinary compressor and system shut down, but also in response to other sensed conditions, such as refrigerant leakage. While the basic object is to isolate evaporator 22 against the entry of additional refrigerant, a one way check valve could be incorporated in a location, such as disk 30, that would allow flow out of the evaporator loop and into the condenser loop under conditions where the refrigerant pressure happened to rise higher in evaporator 22 after system shut down. This could occur if evaporator 22 became significantly warmer than condenser 14, as when solar radiation warms the interior of a vehicle and evaporator 22 significantly more than condenser 14. Internal valve mechanisms other that the coaxial rotating disk 30 could be used to selectively interconnect the various housing ports in the same fashion, such as a member that was pushed axially back and forth. Therefore, it will be understood that it is not intended to limit the invention to just the embodiment disclosed.

What is claimed is:

1. An air conditioning system of the type that has a refrigerant containing component (22) with an inlet (20) and an outlet (24), a compressor (8) with an inlet (10) located downstream of the component outlet (24), and a condenser (14) with an inlet (12) and an outlet (16) located upstream of the inlet (20), and in which it is desired to segregate refrigerant within the system after the system has been shut down, characterised by, a valve housing (28) having, on one side, an upper port (34) connected to the condenser outlet (16), a central port (36) connected to the compressor inlet (10), and a lower port (38) connected to the component outlet (24), and also having, on the opposite side a single port (40) connected to the component inlet (20), and a movable valve member (30) within the housing (28) which, when the system is operating normally, divides and blocks the upper (34) and single (40) ports from the central (36) and lower (38) ports, so that the condenser outlet (16) opens to the component inlet (20), and so that the component outlet (24) opens to the compressor inlet (10), to create a single, normally operating loop, and when the system is shut down, said valve member (30) shifts position to divide and block the single (40) and lower (38) ports from the upper (34) and central (36) ports, so that the component inlet (20) and outlet (24) are opened to one another to create one refrigerant loop encompassing the component (22) and the condenser outlet (16) is opened to the compressor (10) inlet through the compressor (8) to create another refrigerant loop encompassing the condenser (14) and compressor (8) separate from the component (22).

2. An air conditioning system as described in claim 1, further characterised in that the component (22) is an automotive air conditioning system evaporator.

3. An air conditioning system as described in claim 1, further characterised in that the valve housing (28) has a cylindrical inner surface (44) and the movable valve member (30) is a diagonal section of a solid cylinder rotatable coaxially within cylindrical surface (44).

* * * * *